United States Patent Office 3,030,321
Patented Apr. 17, 1962

3,030,321
WATER-SOLUBLE COATING COMPOSITIONS
Louis J. Lombardi, Howard J. Wright, and Paul F. Westfall, Kansas City, Mo., assignors to Cook Paint & Varnish Company, Kansas City, Mo., a corporation of Delaware
No Drawing. Filed May 19, 1960, Ser. No. 30,065
16 Claims. (Cl. 260—23)

The present invention relates to novel water-soluble resinous compositions, and aqueous solutions thereof, suitable for use as coating compositions or as the film-forming components therein.

The principal object of the invention is to provide water-soluble, resinous compositions which dry rapidly in air, although they may also be dried under heat, to provide highly desirable water-insoluble films and coatings. Other objects will also be hereinafter apparent.

Broadly stated, the products of the invention comprise water-soluble salts obtained by neutralizing, e.g. with ammonium or amine salts, the reaction product of (1) a maleic anhydride/drying oil adduct, (2) an acid selected from the group consisting of acrylic acid and methacrylic acid and (3) at least one ethylenically unsaturated monomer which is free from carboxylic acid and anhydride groups. Typically, component (3) may be vinyl toluene, styrene, α-substituted lower alkyl styrenes such as α-methyl styrene, alkyl esters of acrylic and methacrylic acids, especially the lower alkyl esters thereof, e.g. methyl methacrylate, methyl and ethyl acrylate, and mixtures of two or more of these monomers.

It has previously been proposed to form various maleic/oil adducts by treating an oil with maleic anhydride. These adducts have high acid numbers and may be esterified with polyols or neutralized with bases. Water-soluble products can be prepared from these adducts if enough maleic anhydride is added to the oil. However, the resulting water-soluble products are very slow drying and are not otherwise satisfactory for use as such in the preparation of coating compositions.

On the other hand, when a maleic/oil adduct is treated with styrene or vinyl toluene, drying characteristics are improved but neutralization of the resulting product does not give a water-soluble derivative. In contrast, the products of the invention are not only water soluble but also demonstrate a highly desirable air drying rate. The reasons for these unique results are not fully understood, but it is, in any event, apparent that the outstanding characteristics of the present products are due to the particular combination of reactants used herein.

The products of the invention can be prepared, if desired, in two stages by first reacting all of the components together and then neutralizing with an appropriate base. However, the present products are preferably prepared in a three-stage operation involving (1) formation of a maleic/drying oil adduct; (2) reaction of the adduct with a mixture of acid and monomer; and (3) solubilization with base. This preferred method contemplates initially reacting the maleic anhydride (as such or in the acid form) and the drying oil at about 185° C. to 235° C., for a period of time ranging from about 6 to 2 hours. The resulting maleic/oil adduct is then reacted with the mixture of acrylic acid and/or methacrylic acid and one or more ethylenically unsaturated monomers at an elevated temperature, usually between 135° C. and 190° C., for eight to two hours. Whichever procedure is used for preparing the presolubilized reaction product, it is important to avoid the accumulation of unreacted acrylic or methacrylic acid in the reaction mixture. Otherwise, the acid tends to polymerize with itself to give two isolated non-compatible reactions. Accordingly, the acrylic acid and/or methacrylic acid should be added incrementally to the reaction mixture while avoiding any significant accumulation of the free acid in the mixture. The acid addition time will necessarily vary depending upon other conditions, such as the temperature of the reaction mixture. Generally speaking, the slower the addition, the better the results although there are obvious practical limitations on this. Typically, the acid addition should be accomplished over a period of at least two hours in the case where the acid is added to the preformed maleic/oil adduct, provided the reaction temperature is maintained within the previously suggested range of 135° C. to 190° C. In such event, the reactants may be mixed together near the lower end of this range, e.g. 150°–160° C. and when all of the acid and monomer have been added, the mixture is heated up to the higher end of the range (180°–190° C.) until the reaction is substantially completed to give a product having the desired viscosity.

The resulting product is then solubilized by the addition thereto of an appropriate base, e.g. alkali metal hydroxide, such as sodium or potassium hydroxide, ammonium hydroxide or an amine. Usually, this solubilizing reaction is effected at room temperature (e.g. 20–25° C.) although it may be desirable to heat the mixture somewhat to expedite preparation of the solution. The amount of hydroxide or amine utilized will vary depending upon other conditions but should be sufficient to give the desired water-solubility. This usually means adding sufficient base to give a pH of 6 to 9 or, stated another way, from 5 to 15% base, on the weight of the reaction product. However, the percentage of base may vary outside these limits depending, for example, on the acid number of the product and the molecular weight of the base used. Usually, the base is added in aqueous solution but, if desired, the system may include inert solvents in addition to water, e.g. Cellosolve, ethyl alcohol, butyl alcohol, amyl alcohol or the like.

Typical amines which may be used herein in lieu of, or in addition to, ammonium hydroxide, for preparing the water-soluble salt of the present invention are: diethylamine, dimethylamine, triethanolamine, ethylenediamine, triethylamine, morpholine, 2-amino-gammamethyl-1-propanol and di-isopropylamine.

Solubilization with the base may be effected in any desirable manner. One method which is satisfactory involves adding the reaction product to water at an elevated temperature, e.g. 70° C., and holding the resulting mixture for an hour or so at this temperature until an emulsion is formed. The emulsion is then broken to give the desired solution by addition of the base, usually at 40–45° C.

Another effective solubilizing method involves mixing the reaction product and base together and agitating the resulting mixture, preferably while gradually heating up to 70° C. or so, until a homogeneous solution is obtained.

The solubilized products of the invention are desirably made up as water-solutions containing from 20 to 50% by weight non-volatiles with viscosities ranging from A to Z–6 by the Gardner-Holdt method. These solutions constitute highly desirable coating vehicles to which there may be added any of the conventional ingredients for coating compositions, e.g. fillers, pigments, etc. These compositions dry rapidly in air (temperatures 20–25° C.) into excellent, water-insoluble films. The actual drying time in any particular situation will vary but, generally speaking, tack-free films are obtained in from about 10 to 40 minutes, typically 20 minutes. To facilitate drying, means may be provided for circulating air at 20–25° C. or heated air over the coated article. If desired, the drying time can be shortened by heating or baking at, for example, 125 to 175° C. for 5 to 30 minutes, typically 20 minutes at 125° C.

Because of their air-drying characteristics and their freedom from organic solvents, aqueous solutions according to the invention may be applied to any type of substrate, e.g. wood, paper, metals and alloys, such as steel, aluminum and tinplate, fabrics, films of synthetic thermoplastic and/or thermosetting materials, such as Mylar, etc.

The coating solutions described herein may include conventional air-drying catalysts, such as cobalt naphthenate, lead naphthenate and like driers. This may be accomplished by emulsifying the catalyst, e.g. by mixing equal parts of the drier with an aqueous solution of wetting agent, typically a 25% solution of Tergitol NP35, and adding this to the aqueous coating solution. Usually, sufficient drier is used to give 1–3% by weight thereof in the coating formulation.

Linseed oil is the preferred drying oil for use herein since this gives a product having an excellent air-drying rate and other optimum characteristics. However, other drying oils may be used to obtain special characteristics. For example, soya oil may be used to give a product of somewhat improved color but the rate of air dry of the resulting product is slower than in the case of the corresponding linseed oil product. Other drying oils include dehydrated castor oil, safflower oil and tall oil which may be used to advantage.

The amount of maleic anhydride used for preparing the present products can be fairly widely varied depending, for example, upon the drying oil which is utilized and other operating details. Usually, a mixture of maleic anhydride and oil comprising 5 to 30% by weight of maleic anhydride is satisfactory for use herein.

The acid and ethylenically unsaturated monomer components desirably comprise from 20 to 60% by weight of the total amount of the four essential reactants, which are utilized, in order to obtain a product which gives a film of optimum characteristics. The ratio of acrylic acid and/or methacrylic acid to the ethylenically unsaturated monomer or monomers will depend upon other operating factors, particularly the acid number desired in the final product. In this connection, it should be noted that the final product, before solubilization, should have an acid number of at least 50 and usually not substantially in excess of 120. To this end, the 20 to 60 parts of acid and ethylenically unsaturated monomer components per 100 parts total reactants, indicated heretofore, will usually comprise from about 3 to 13 parts of acid, with the balance monomer.

The reaction between the maleic/oil adduct and the other essential components may be facilitated by using a suitable polymerization catalyst, e.g. a peroxide catalyst such as ditertiary butyl peroxide, cumene hydroperoxide, benzoyl peroxide and other free-radical type catalysts. This reaction is conveniently carried out at atmospheric pressure in a closed kettle fitted with a condenser system. The reaction may be carried out in the presence of an inert gas (e.g. $CO_2$) to give a product of optimum color characteristics.

The invention is illustrated, but not limited, by the following example wherein parts and percentages are by weight unless otherwise stated:

*Example*

90 parts linseed oil and 10 parts maleic anhydride were mixed together, heated to approximately 200° C. and held at this temperature for about 2 hours. At the end of this time, the mixture had an acid number of 58.1, a viscosity of W–X (Gardner-Holdt) and a weight per gallon of 8.21 pounds.

Approximately 10.40 parts of the above product (maleic-treated oil or maleic/oil adduct) were then heated at about 150° C. while 3.42 parts vinyl toluene, 0.5 part acrylic acid and 0.12 part di-tertiary butyl peroxide were mixed together separately from maleic-treated oil. This mix was then added gradually to the maleic-treated oil over a four hour period, the temperature being maintained between 150° C. and 160° C. After addition of the mix was completed, the temperature was increased to 190° C. and held at this temperature until a sample of the product, reduced with an equal part of xylene, gave a B viscosity (Gardner-Holdt). The resulting product was then dissolved in water with the addition of 0.7 part $NH_4OH$ to give a solution which was 35% non-volatiles. The resulting solution was then coated onto tinplate and allowed to air dry (25° C.). The coating was tack-free in about twenty minutes and resulted in a film having good flex and other attractive characteristics.

It will be appreciated that various modifications may be made in the invention as described in the foregoing example and accompanying description. Accordingly, the scope of the invention is set forth in the following claims wherein we claim:

1. A water-soluble resinous composition capable of air-drying into water-insoluble form, said composition comprising a water-soluble salt selected from the group consisting of water-soluble ammonium and amine salts of the reaction product of (1) a drying oil, (2) maleic anhydride, (3) an acid selected from the group consisting of acrylic and methacrylic acids, and (4) at least one ethylenically unsaturated monomer which is free from carboxylic acid and carboxylic anhydride groups.

2. A water-soluble resinous composition capable of air-drying into water-insoluble form, said composition comprising a water-soluble salt selected from the group consisting of water soluble ammonium and amine salts of the reaction product of (1) a maleic anhydride-treated drying oil, (2) an acid selected from the group consisting of acrylic and methacrylic acids, and (3) at least one ethylenically unsaturated monomer which is free from carboxylic acid and carboxylic anhydride groups.

3. The composition of claim 1 wherein said drying oil is linseed oil.

4. The composition of claim 3 wherein said monomer is vinyl toluene.

5. The composition of claim 4 wherein said acid is acrylic acid.

6. The composition of claim 4 wherein said acid is methacrylic acid.

7. The composition of claim 1 wherein said reaction product has an acid number of at least 50.

8. A coating vehicle comprising an aqueous solution of the composition of claim 1.

9. The method which comprises coating a substrate with the composition of claim 1 and drying the same.

10. The method of claim 9 wherein the coating is air dried.

11. The coated product of claim 9.

12. The method of preparing the composition of claim 1 which comprises treating said reaction product with a member of the group consisting of ammonium hydroxide and water-soluble organic amines.

13. The method of claim 12 wherein said reaction product is prepared by pre-treating said oil with maleic anhydride and thereafter reacting the resulting maleic-treated oil with said acid and monomer.

14. The method of claim 13 wherein said acid is added to the maleic-treated oil in increments while avoiding the accumulation of unreacted acid in the reaction mixture.

15. A water-soluble resinous composition capable of air-drying into water-insoluble form, said composition comprising a water-soluble essentially neutral salt of the reaction product of (1) a drying oil, (2) maleic anhydride, (3) an acid selected from the group consisting of acrylic and methacrylic acids, and (4) at least one ethylenically unsaturated monomer which is free from carboxylic acid and carboxylic anhydride groups.

16. A water-soluble resinous composition capable of air-drying into water-insoluble form, said composition comprising a water-soluble ammonium salt of the reaction product of (1) a maleic anhydride/drying oil adduct, (2) an acid selected from the group consisting of acrylic and methacrylic acids, and (3) at least one ethylenically unsaturated monomer selected from the group consisting of vinyl toluene, styrene, lower alkyl styrenes, and the lower alkyl esters of acrylic and methacrylic acids, said composition having an acid number of at least 50 and including 3 to 13 parts of acid per 100 parts of said composition.

References Cited in the file of this patent

UNITED STATES PATENTS 2,941,968     McKenna _____ June 21, 1960